(No Model.) 5 Sheets—Sheet 1.
W. B. CULVER.
COAL CRUSHING OR BREAKING ROLLS.
No. 571,264. Patented Nov. 10, 1896.
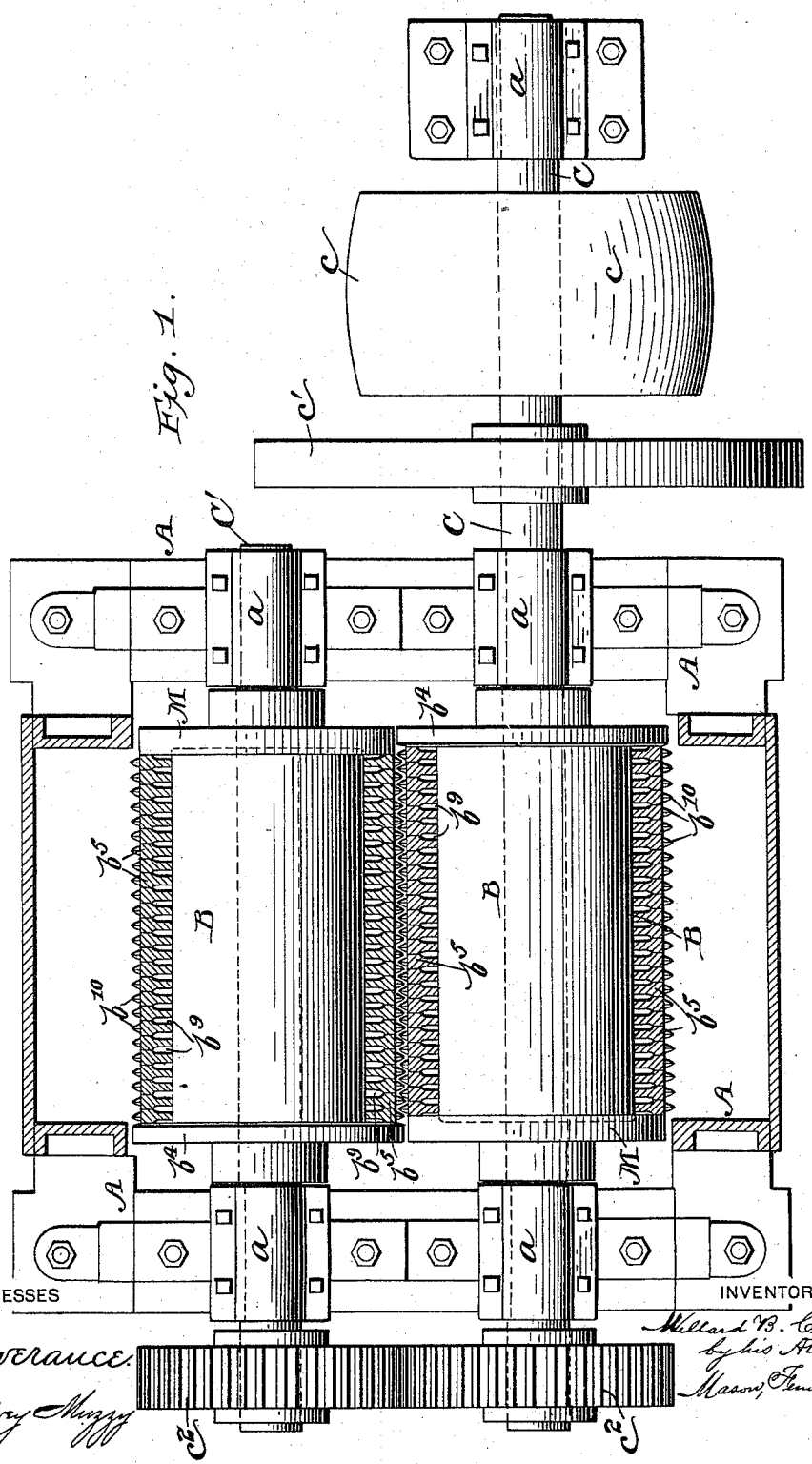
WITNESSES INVENTOR (No Model.) 5 Sheets—Sheet 2.
W. B. CULVER.
COAL CRUSHING OR BREAKING ROLLS.
No. 571,264. Patented Nov. 10, 1896.
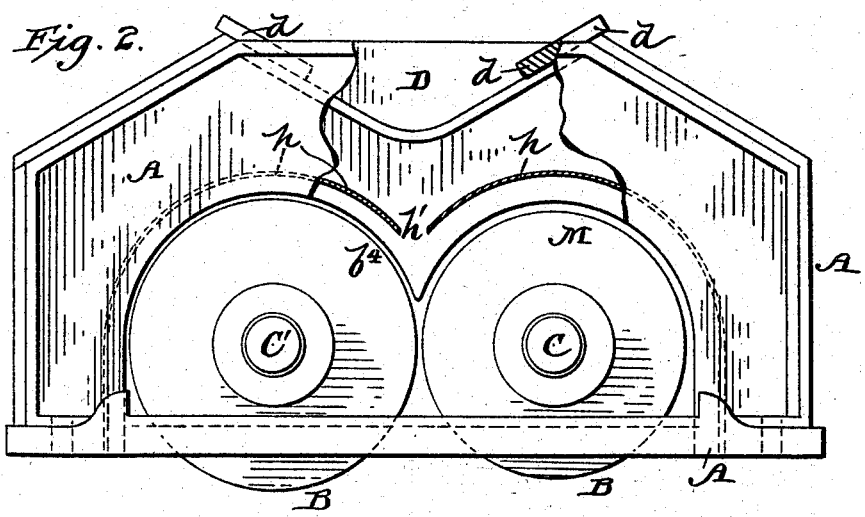
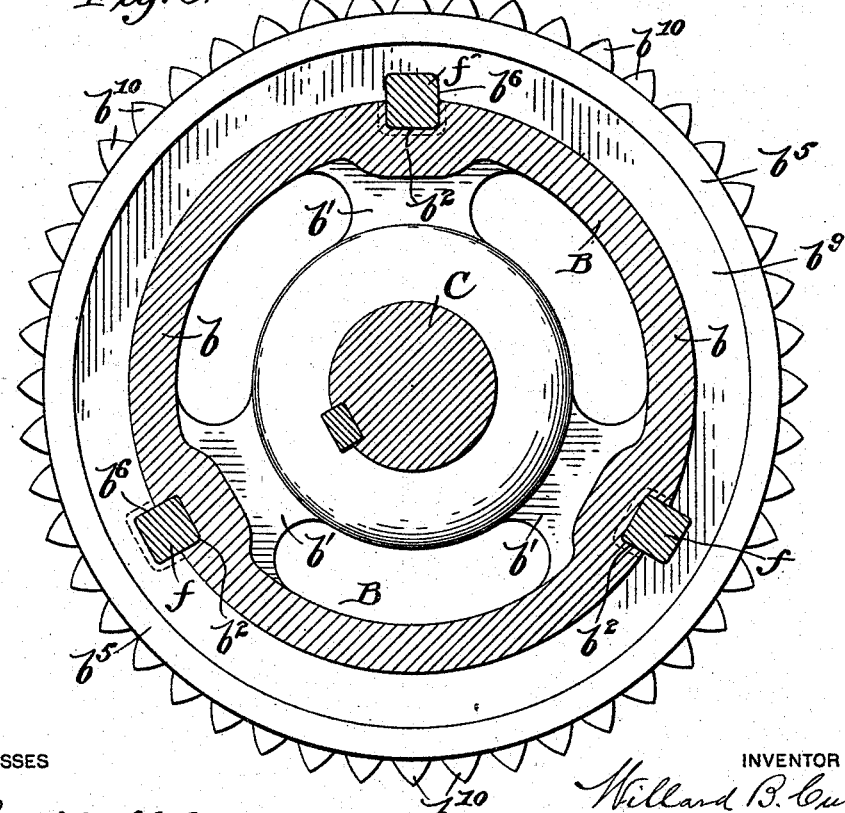
WITNESSES
INVENTOR
Willard B. Culver
by his Attorneys
Mason, Fenwick & Lawrence (No Model.) 5 Sheets—Sheet 3.

W. B. CULVER.
COAL CRUSHING OR BREAKING ROLLS.

No. 571,264. Patented Nov. 10, 1896.

WITNESSES
INVENTOR (No Model.) 5 Sheets—Sheet 4.
W. B. CULVER.
COAL CRUSHING OR BREAKING ROLLS.
No. 571,264. Patented Nov. 10, 1896.
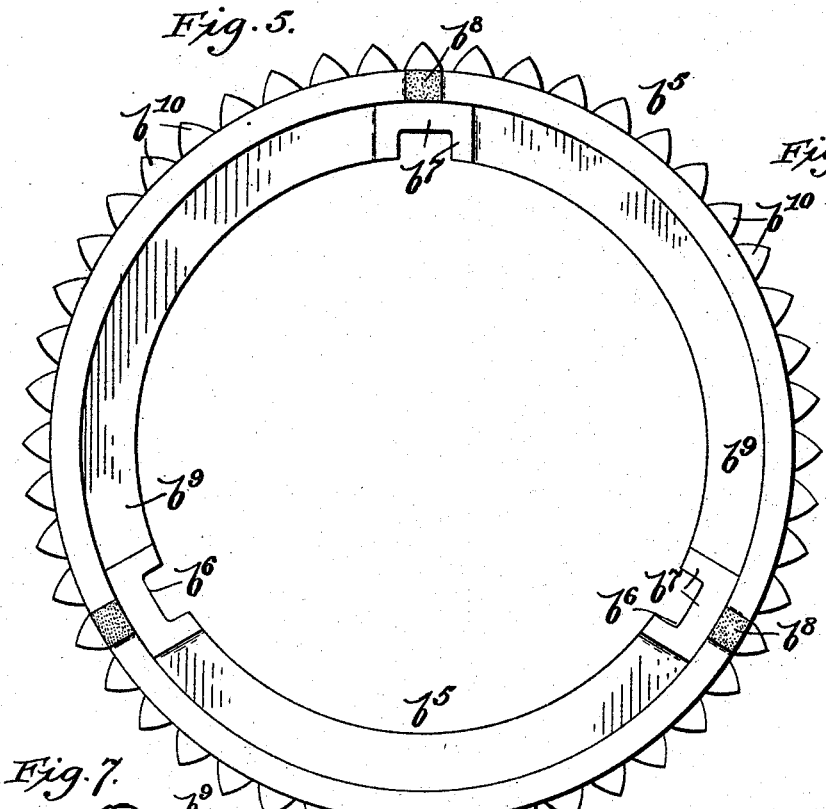
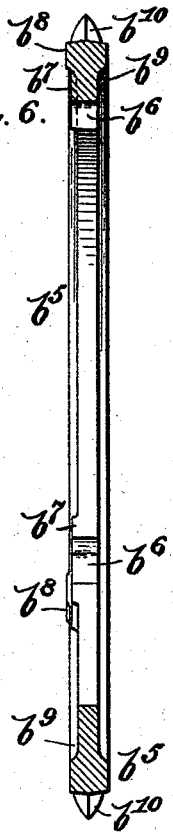
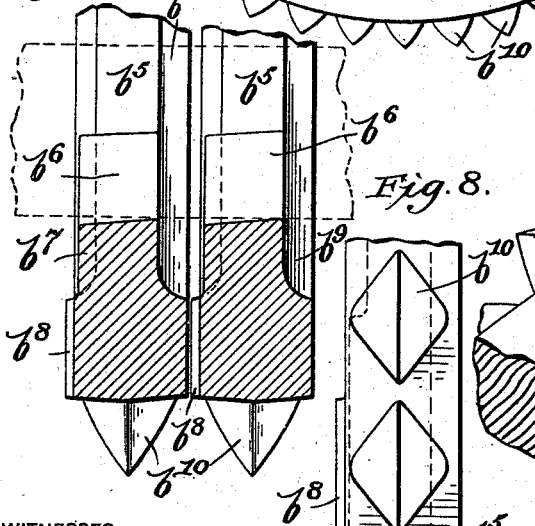
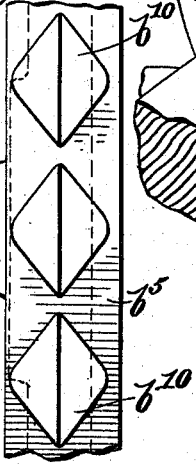
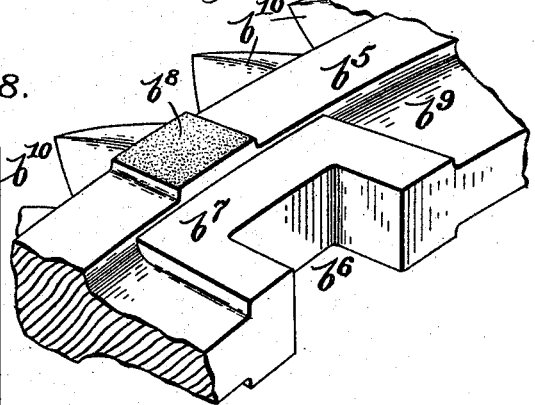
WITNESSES
INVENTOR (No Model.) W. B. CULVER. 5 Sheets—Sheet 5.
COAL CRUSHING OR BREAKING ROLLS.
No. 571,264. Patented Nov. 10, 1896.

WITNESSES
INVENTOR
Willard B. Culver
by his Attorneys
Mason, Fenwick & Lawrence

UNITED STATES PATENT OFFICE.

WILLARD B. CULVER, OF SCRANTON, PENNSYLVANIA.

COAL CRUSHING OR BREAKING ROLLS.

SPECIFICATION forming part of Letters Patent No. 571,264, dated November 10, 1896.

Application filed February 24, 1896. Serial No. 580,485. (No model.)

*To all whom it may concern:*

Be it known that I, WILLARD B. CULVER, a citizen of the United States, residing at Scranton, in the county of Lackawanna and State of Pennsylvania, have invented certain new and useful Improvements in Coal Crushing or Breaking Rolls; and I do hereby declare the following to be a full, clear, and exact description of the invention, such as will enable others skilled in the art to which it appertains to make and use the same.

My invention relates to improvements in crushers or breakers, and has more particular relation to crushing or breaking rolls for coal.

The invention consists of certain novel constructions, combinations, and arrangements of parts, all of which will be hereinafter more particularly set forth and claimed.

Figure 4:
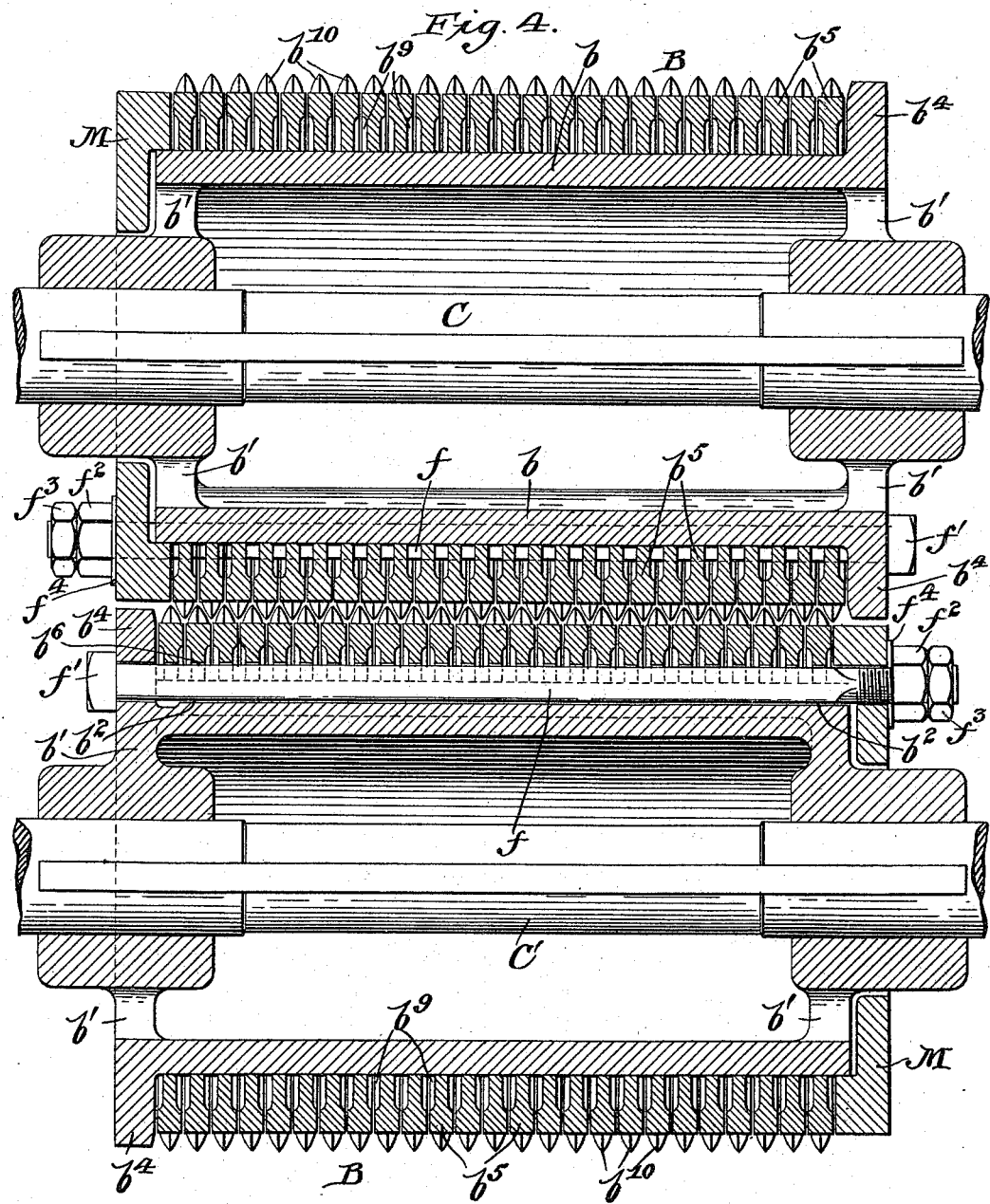
Figure 10:
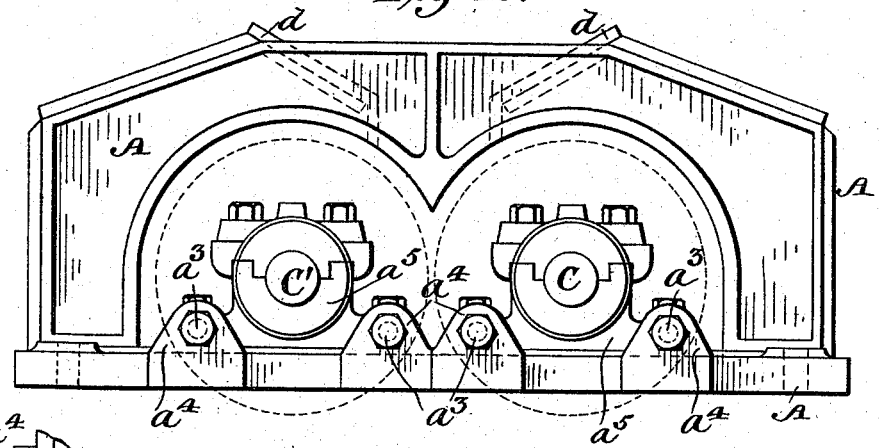
Figure 11:
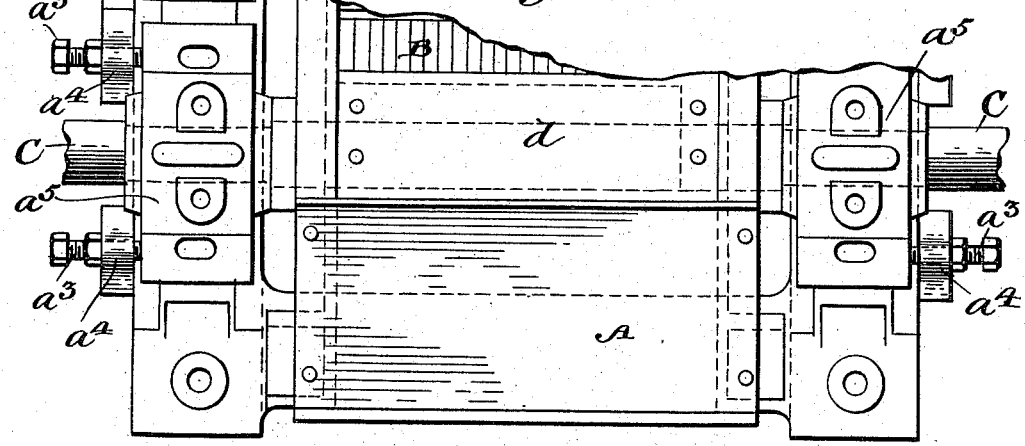
Figure 12:
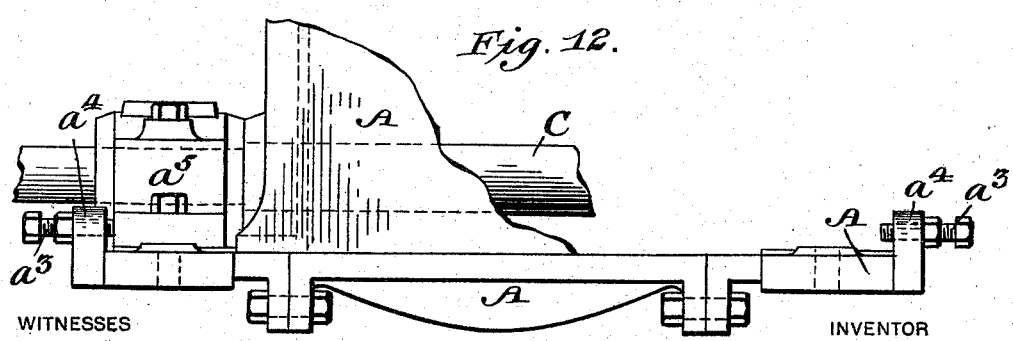

In the accompanying drawings, forming part of this specification, Figure 1 represents a top plan view, partly in horizontal section, of a crusher or breaker embodying my invention. Fig. 2 represents an end elevation of the same, partly broken away to expose the interior. Fig. 3 represents a detail vertical transverse section through one of the rolls. Fig. 4 represents a central horizontal section through a pair of my rolls. Fig. 5 represents a side elevation of one of the toothed rings of which my rolls are composed. Fig. 6 represents a central vertical section of the same. Fig. 7 represents a detail enlarged view of portions of two adjoining rings. Fig. 8 represents a detail enlarged front elevation of a portion of the rim of one of the rings. Fig. 9 represents a detail perspective view of the same. Fig. 10 represents an end elevation of my machine, illustrating the adjusting devices for moving the crushing-rolls longitudinally. Fig. 11 represents a top plan view of the same, partly broken away; and Fig. 12 represents a side elevation of said machine, partly broken away.

A in the drawings represents the frame of the machine; B, the crushing or breaking rolls; C, the main power-shaft, and D the feed-hopper.

The frame A is of any suitable construction and supports the main shaft C and an auxiliary shaft C' in suitable bearing-boxes $a\ a$. The said shaft C carries the usual belt-wheel $c$ and balance-wheel $c'$. The shafts C and C' are geared together by gears $c^2\ c^2$, mounted on their respective inner ends and meshing together, whereby the shafts are revolved in opposite directions.

The crushing-rolls B each comprise a hollow cylinder $b$, having spider ends $b'$, whereby it is securely keyed to its respective shaft by any suitable key or spline. Each cylinder is provided with a plurality of longitudinal grooves $b^2$, which are preferably square in cross-section and are adapted to receive the lower halves of the spline-bolts $f$.

The bolts are square in cross-section and are each provided with a head $f'$, that bears against the outside of a flange $b^4$, hereinafter described. The opposite ends of each bolt are screw-threaded to receive securing-nuts $f^2\ f^3$. The cylinders are also each provided with an integral annular flange $b^4$ at one end. This flange forms a stop or abutment against which the first of the toothed rings $b^5$ rests when it is slipped upon the cylinder. These rings are each formed of such a size as to fit snugly over the cylinder $b$ and are provided with square spline-grooves $b^6$, that coincide in position with the grooves $b^2$ when the rings are slipped upon the cylinder. Each of the grooves is surrounded on each side of the ring by a strengthening-boss $b^7$. It is necessary in this style of roll that the toothed rings should have a firm bearing-foundation one upon the other, and to accomplish this I provide each ring on one side with projections $b^8$, preferably three in number, so that the adjoining rings will only engage at these points and thus become firmly seated against each other where drawn together by the bolt-splines $f$. These rings are made of manganese steel, which, as is well known, is nearly impracticable to work. By forming the projections $b^8$ on the rings it only becomes necessary to dress the small contacting surfaces presented by them. This is done by an emery-wheel. The rings are formed on each side with grooves $b^9$, whereby a great saving in the metal is accomplished without any appreciable loss of strength. Any suitable-shaped teeth $b^{10}$ are cast upon the periphery of each ring.

By forming my rolls of ring-sections and of manganese steel I am enabled to form the teeth $b^{10}$ very near together and at the same time make them smaller than has heretofore been possible because of the degree of strength required in said teeth to prevent them from being crushed and broken. The rings are retained on the cylinders by follower-plates M, through which the bolts $f$ pass and against which the securing-nuts $f^2 f^3$ and a washer $f^4$ are tightened.

When the rings become worn or broken, they can readily be removed and replaced by new ones by removing the follower and slipping the rings off the cylinder, after having first removed the proper bearing-box $a$. The splines $f$ hold all the rings firmly in position on the cylinder both against lateral and longitudinal movement thereon.

Over each roll a guard $h$ is mounted, so as to conform to the contour of the roll, and said guards extend up from the outer side of each roll and over the same to within a short distance of each other, so as to have an open space directly over the point where the teeth of the two rolls intermesh. This prevents any coal slipping back over the outer sides of the rolls and not being broken. The hopper D is mounted above the plates $h$ and is provided with any suitable adjustable bottom $d$, whereby the discharge-opening may be regulated. It of course will be readily seen why the projections $b^8$ are formed on the rings.

It would be next to impossible to fit the flat sides of two rings together firmly as they come from the mold, and as it is next to impossible to work the metal of which the rings are formed, so as to reduce the sides to sufficient smoothness, it became necessary to provide some means whereby the rings could find a firm bearing one against the other. This I have accomplished by forming the rings with the projections, which very seldom fail to find a firm foundation against the adjoining ring.

The crushing-rolls are liable to be moved longitudinally by wearing or by the springing of the frame and cause the teeth on one roll to strike the teeth on the other, and thus injure or break the same. To obviate this, I make the rolls movable longitudinally independently of each other by means of adjusting-bolts $a^3$, that pass through lugs $a^4$, mounted on the frame and engage movable journal-boxes $a^5$, in which the shafts of the rolls are mounted.

When it is desired to readjust the rolls so that the teeth interlock perfectly without striking each other, the adjusting-bolts $a^3$ are tightened at one end of the roll and loosened at the other, whereby the roll is moved longitudinally.

Having now described my invention, what I claim as new, and desire to secure by Letters Patent, is—

1. In a crusher or breaker, the combination with a suitable frame, of a plurality of crushing-rolls provided with steel-toothed peripheries formed of separated rings on which the teeth are cast, and mounted upon the said frame, and means for adjusting said rolls longitudinally independently of each other so as to have the teeth stand exactly central of the spaces in which they move, substantially as described.

2. A coal crusher or breaker, comprising a frame, a plurality of crushing-rollers mounted in the same, and each comprising a hollow revoluble cylinder, a series of removable steel rings mounted on said cylinder and having integral toothed peripheries, and separated, ground projections on the sides of said rings, whereby they are firmly seated one against the other, and means for holding the rings assembled, substantially as described.

3. In a coal-breaker, a pair of crushing-rollers mounted in a frame provided with means for adjusting the rollers longitudinally independently of one another, and each of said rollers being formed of a hollow cylinder provided with a fixed flange at one end and a movable follower at the other, and said cylinder having a series of separated narrow, manganese-steel breaking-rings slipped on its periphery and bolted in position; said rings having small integral teeth cast on them, and the rings being arranged so that the teeth of one roller will enter spaces between the teeth of the other roller, and each of the rings also being formed with side surfaces near its periphery on one of which side surfaces small, spaced, contacting, ground projections are formed, and, the rings having a dishing form inward from said projections, all in such manner that a light, yet a firm and durable structure for breaking coal in small uniform sizes is produced, and the rollers can be adjusted so as to accurately work with one another, as set forth.

In testimony whereof I hereunto affix my signature in presence of two witnesses.

WILLARD B. CULVER.

Witnesses:
EDWARD T. FENWICK,
N. S. HOCKMAN.